ROBERT H. FREDERICKS
ROGER P. DANIEL
INVENTOR.

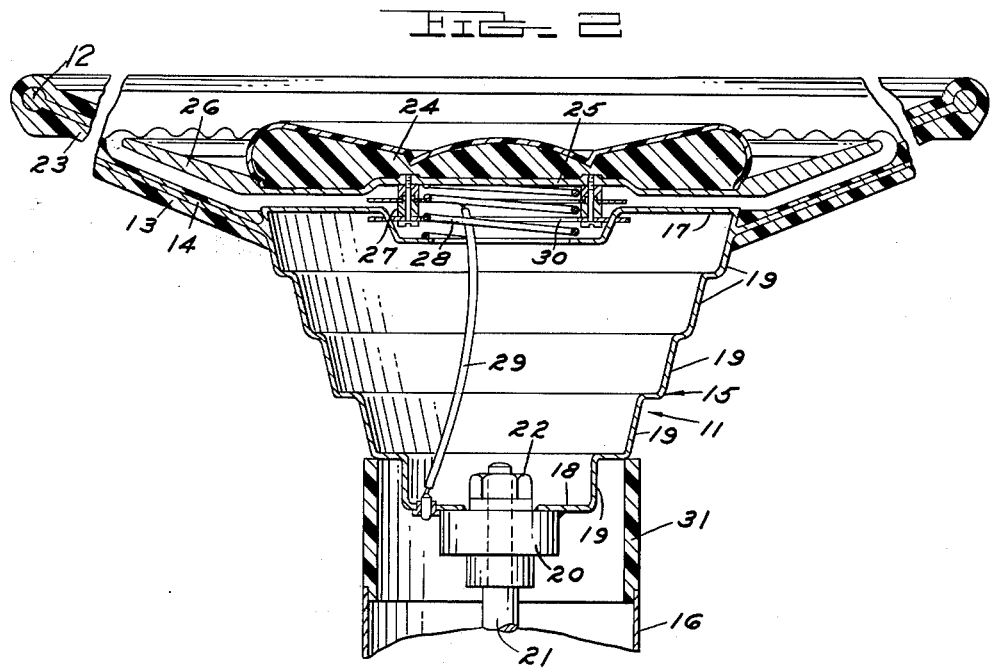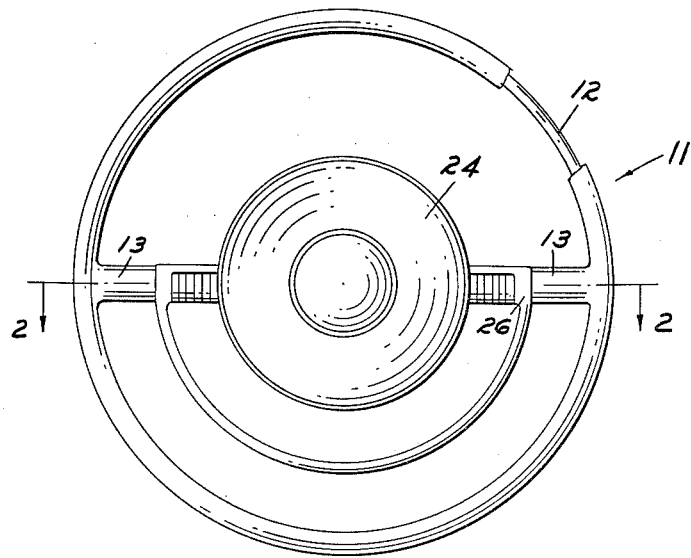

BY J. R. Faulkner
J. J. Roethel
ATTORNEYS

United States Patent Office 3,016,764
Patented Jan. 16, 1962

3,016,764
SAFETY STEERING WHEEL
Robert H. Fredericks and Roger P. Daniel, Dearborn, Mich., assignors to Ford Motor Company, Dearborn, Mich., a corporation of Delaware
Filed May 9, 1960, Ser. No. 27,911
7 Claims. (Cl. 74—552)

This invention relates to steering wheels and more particularly to safety or impact energy absorbing steering wheels for automobiles.

The energy absorbing concept in the design of safety steering wheels, first used on a large scale on motor vehicles of the 1956 model year, was the result of observations which indicated that many fatal injuries sustained from driver contact with the steering wheel during collisions were caused by the crushing or penetration of the chest by the small area, rigid hub. The recessed hub wheel design was developed to provide collapsible distance between the rim and its supporting spoke structure and the hub. The substantial area of the rim opposing the driver's chest was relied upon to distribute any impact load to prevent localized high-pressure concentrations.

Statistics gathered since the introduction of the energy absorbing concept in safety steering wheels show that the recessed hub steering wheel has reduced the incidence of chest crushing injuries by half when compared to the previously used small hub, flat wheel design. However, the same data indicates that the less severe injuries have not been reduced. The conventional recessed hub steering wheels have a rigid hub area and a stiff rim which is supported by comparatively rigid spokes. With this design, lacerative or bruising injuries can be inflicted on the chest, face, neck or abdomen of the driver when the wheel is impacted at moderate speeds. The flat type wheel had a rim support which could be easily deformed and thus provided a measure of energy absorbing capacity when impacted at low to moderate speeds. As a result, unless the present safety-type steering wheel is evaluated only on the basis of reduction in critical-through-fatal injuries, its injury reducing advantages are obscured since the preponderance of steering wheel injuries are in the range of minor-through-severe degrees.

It is an object of the present invention to provide further improvement in safety steering wheels. The improved steering wheels are constructed and arranged to reduce the incidence of the less serious injuries which occur in the majority of automobile accidents while at the same time providing a higher level of protection against crushing and penetrating injuries than is provided by the recessed hub steering wheel now in use.

The present invention embodies a two-stage collapsible steering wheel comprising a steering wheel rim supported by a spoke system which provides adequate torsional stiffness for steering the vehicle while permitting axial displacement of the rim under relatively low impact load conditions. The spoke system is supported on a central hub constructed and arranged to progressively collapse under load to absorb any impact energy over and above that causing axial displacement of the rim. The central hub comprises a bellows structure in the form of a stepped sheet metal can which is substantially frustum-shaped. The bellows structure is mounted in an inverted position, i.e., with its larger diameter end up. The steering wheel spoke system is attached to this upper or larger diameter end. The small diameter end of the bellows structure terminates at the attachment hub coupling the steering wheel to the steering shaft. The upper face of the central hub or bellows structure is preferably padded to minimize soft tissue injury and permit conformability to the shape of an impacting human body for good load distribution.

Other objects, advantages and features of this invention will be made more apparent as this description proceeds, particularly when considered in connection with the accompanying drawings, wherein:

FIG. 1 is a plan view of a steering wheel incorporating the principles of the present invention;

FIG. 2 is an enlarged sectional view taken substantially on the line 2—2 of FIG. 1 looking in the direction of the arrows;

Figure 4:
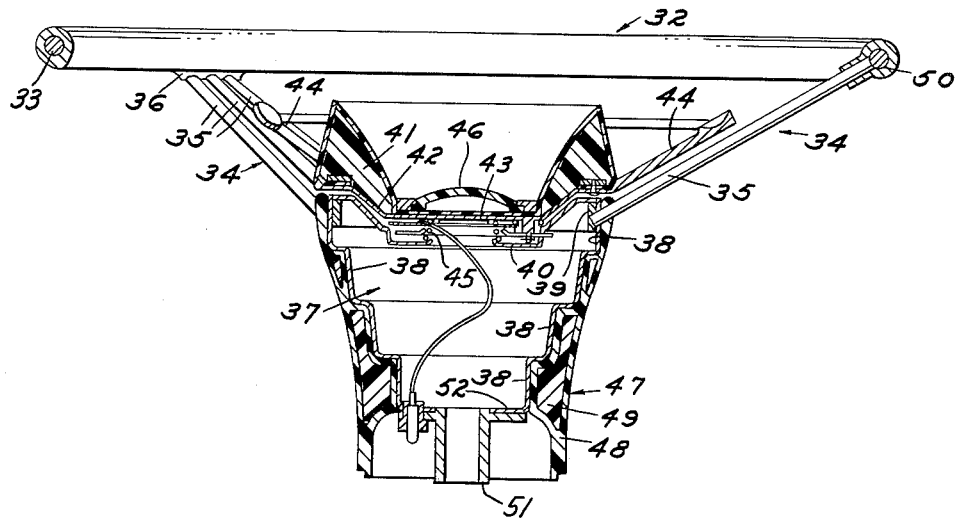
FIG. 4 is an enlarged sectional view taken substantially through the line 4—4 of FIG. 3 looking in the direction of the arrows, the steering wheel being rotated from its FIG. 1 position for convenience of illustration.

Referring now to the drawings and particularly to FIGS. 1 and 2, there is shown a steering wheel, generally designated 11, embodying the principles of the present invention. The steering wheel 11 comprises an annular rim 12 supported on a pair of diametrically opposed spokes 13. The spokes 13 are illustrated as comprising flat spring steel members 14 which are welded or otherwise securely attached at their outer ends to the rim 12. The inner ends of the spring steel members 14 are welded or otherwise securely attached to a central hub structure, generally designated 15.

The construction and arrangement of the central hub structure 15 comprises an important feature of the present invention. As best seen in FIG. 2, the central hub structure 15 is generally frustum-shaped and is mounted in an inverted relationship on the upper end of the steering column 16. That is, the large diameter or base end 17 of the hub structure is at the upper end and the small diameter end 18 is at the lower end. The central hub structure 15 may be referred to as a bellows structure since it is formed as a stepped sheet metal can or, in other words, since it is provided with a series of concentric cylindrical steps 19 of decreasing diameter from its upper end toward its lower end.

The inner ends of the spoke members 14 are preferably attached to the outer wall surface of the uppermost cylindrical step 19 of the hub or bellows structure 15. It will be noted that the spokes 13 are relatively short and lie at a relatively flat angle to the plane of the base end 17 of the hub or bellows structure 15. The small end 18 of the hub structure is welded or otherwise securely attached to an attachment hub 20. As will be readily understood, the attachment hub 20 is adapted to be coupled, as by a splined connection, to the upper end of a steering shaft 21 housed within the steering column 16. The usual retention nut 22 is provided to prevent axial displacement of the hub structure 15 from the steering shaft 21.

The rim 12 and the spring steel spoke members 14 are preferably covered by a hard rubber layer 23.

The upper or the base end 17 of the central hub or bellows structure 15 is covered by a pad 24 of soft cushion materials such as a plastic foam type material. As illustrated, the hub pad 24 is shown supported on the center dish-like portion 25 of a horn ring structure 26. Conventional bayonet type disconnect devices, generally indicated at 27, interlock and retain the horn ring on the base end 17 of the bellows structure 15. A suitable coil spring 28 is interposed between the horn ring structure 26 and the base end 17 of the bellows structure to yieldably support the horn ring above the hub structure. The lead wire 29 from the horn contact element 30 is shown passing through the hollow center of the hub structure 15. A cast flexible foam plastic sleeve 31 may be utilized to close the gap between the upper end of the steering column 16 and the lower edge of the penultimate cylindrical step 19.

Figure 3:
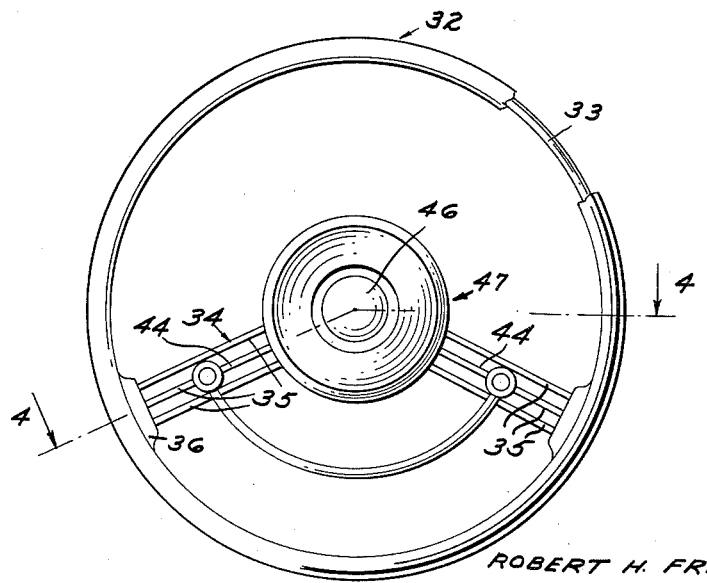
FIG. 3 is a plan view of a second embodiment of the present invention.

Referring now to FIGS. 3 and 4, a second embodiment of the present invention is illustrated. In this embodiment, the steering wheel, generally designated 32, comprises an annular rim 33 supported on a pair of spoke units 34. The spoke units are angularly related to each other rather than being directly diametrically opposed as in the previously described embodiment. In FIG. 3, the position of the spoke units 34 is shown as they would appear in normal straight-ahead driving position. Each spoke unit 34 comprises three small diameter rods 35 having their upper or outer ends received in suitable bosses 36 projecting inwardly from the steering wheel rim 33. The inner ends of the rods 35 project through suitable apertures in a central hub structure 37. It will be noted that the central hub structure 37 comprises a bellows structure somewhat similar to the central hub or bellows structure 15 of the previously described embodiment. The central hub or bellows structure 37 is provided with a series of concentric cylindrical steps 38 of decreasing diameter from top to bottom. The spokes 34 project through apertures in the outer wall of the uppermost of the steps 38. The inner or lowermost ends of the spokes are anchored in a retaining ring 39 attached to the inner wall of the uppermost step 38. It will be understood that the base 40 of the central hub or bellows structure 37 may be welded or otherwise securely attached to the upper peripheral edge of the central hub cylindrical wall after the retaining ring 39 has been assembled to the inner surface of the wall.

The larger or upper end of the bellows structure 37 is covered by an annular pad 41 which has maximal thickness over the rigid periphery of the bellows structure. As best seen in FIG. 4, the pad is supported on the annular rim portion 42 of the center dish-like portion 43 of a conventional horn ring structure 44. As in the previously described embodiment, the horn ring assembly 44 is yieldingly supported above the base portion 40 of the bellows structure by means of a coil spring 45. The center of the horn ring may be provided with a suitable ornament or a yieldable cushion element 46.

The stepped sides of the bellows structure 37 may be covered with a suitable flexible cover 47. The latter may comprise a hard rubber outer shell 48 having soft foam material 49 molded within cavities within the thicker sections of the cover 47. In this embodiment, preferably only the annular rim 33 is covered with a suitable layer 50 of material to improve the appearance and gripping qualities thereof. As in the previously described embodiment, the steering wheel assembly is adapted to be mounted on the upper end of a steering wheel shaft by means of an attachment hub 51 welded or otherwise securely coupled to the lower end plate 52 of the bellows structure 37.

Both of the embodiments of the present invention described above incorporate performance features which essentially satisfy the desired objectives for a safety steering wheel. In each embodiment the rim 12 or 33 is supported by a spoke system 13 or 34 which provides adequate torsional stiffness for steering control while permitting axial displacement of the rim under impact loading. This feature minimizes injury to the face, neck and abdomen when these areas of the driver's body contact the rim. The central hub 15 or 37 has a large area for distributing an impact load and provides a structure which is progressively collapsible under load to absorb the impact energy. By this means, peak impact loading is reduced. By padding the base of the hub, there is a minimization of soft tissue injury. The padding permits conformability to the shape of the impacting person's body for good load distribution. It should be emphasized, perhaps, that the collapsible central hubs 15 or 17 are true energy absorbing devices as distinguished from energy storing devices. Safety steering wheel columns are known in the prior art in which the column comprises telescoping members which house spring devices adapted to return the telescoping members to their original condition after they have been telescopically collapsed upon impact. The disadvantage of this type of construction is that the spring used is an energy storing device. The greater the impact force upon the steering wheel, the greater the energy input into the spring. When the force causing compression of the spring is halted, the compressed spring with then cause the steering column to rebound throwing the body of the vehicle driver rearwardly. The whiplash effect of the rebound is, of itself, a source of injury.

The hub structures embodying the present invention are only energy absorbing devices. If the impact force is sufficient to cause the hub structure 15 or 37 to collapse, there is no rebound effect. The steering wheel hub becomes permanently deformed. If the impact is great enough to cause the body of the vehicle driver to hit the steering wheel with sufficient force to collapse the latter beyond a first stage or resilient stage of collapse into a second or permanently deformed state of collapse, the cost of the steering wheel becomes insignificant when measured against the lessened injury potential derived from its use.

Since, in both embodiments, the spokes are attached at the upper end of the bellows structure, the angle of the spokes is flatter than in most conventional recessed hub type steering wheels.

Steering wheels such as embodied in the present invention permit the use of a two-spoke configuration without any reduction in total energy absorbing capacity. The two-spoke steering wheel has the advantage of reducing line of sight interference with the instruments and controls mounted on the instrument panel. Since the rim takes only the steering loads, it can be made lighter in weight than conventional type recessed hub steering wheels in which the rim and spokes must provide the support necessary to absorb the impact energy as they deform under load. A lighter weight steering wheel rim reduces the moment of inertia for rotation and thus improves steering control response. This is of particular importance with power steering.

The difference beween the two embodiments shown and described is primarily that the embodiment of FIGS. 1 and 2 may be said to be a standard or economy version of the steering wheel while the embodiments of FIGS. 3 and 4 may be said to be the deluxe version. The rim and spoke structure of the first embodiment is somewhat less expensive to manufacture and also a cost saving is obtained by eliminating the flexible cover over the step sides of the bellows structure.

As a further economy measure, the thickness of the pad over the face of the bellows could be reduced. It would not be desirable to eliminate this pad entirely. A pad of reduced thickness or, if eliminated, reduces the safety effectiveness of the wheel, particularly during the frequent impact condition where the face or head of the occupant strikes the center of the wheel. Also, during a chest impact without a pad, soft tissue bruising and lacerations hazards would be increased and the load would be less effectively distributed. This could result in a localized high pressure chest contact and more serious injury.

It will be understood that the invention is not to be limited to the exact construction shown and described, but that various changes and modifications may be made without departing from the spirit and scope of the invention as defined in the appended claims.

We claim:

1. A safety steering wheel comprising a rim, a hub, an inverted frustum-shaped member concentric with and interposed between said rim and hub, spoke means connecting said rim to the upper end of said member, the peripheral wall of said member comprising a series of stepped portions, said member terminating in an end wall connected to said hub, said spoke means being constructed and arranged to resiliently support said rim for movement toward said hub under an impact load, said stepped portions being constructed and arranged to telescopically and deformably collapse with energy absorbing effect under an impact load in excess of that capable of causing movement of said rim toward said hub.

2. A safety steering wheel collapsible in two stages under an impact load, said steering wheel comprising a rim, an inverted frustum-shaped member, spoke means supporting said rim on the upper end of said member in spaced substantially parallel relationship to the end plane of the latter, said spoke means being constructed and arranged to resiliently resist movement of said rim toward a coplanar relationship with said end plane to provide a first stage of collapse of said steering wheel under an impact load, the peripheral wall of said member comprising a series of stepped portions, said member terminating in an end wall connected to said hub, said member stepped portions being constructed and arranged to telescopically and deformably collapse with progressively increasing resistance to movement of the upper end of said member toward said hub to provide energy absorbing effect under an impact load exerted on said steering wheel in excess of that causing said first stage collapse of said rim supporting spoke means.

3. A two-stage collapsible steering wheel comprising a rim, a hub, and an impact energy absorbing means interposed between said rim and said hub, said impact energy absorbing means comprising a bellows structure of decreasing diameter from one end to the other, axially resilient means supporting said rim on the larger diameter end of said bellows structure in spaced substantially parallel relation to the end plane of said larger diameter end, said rim being supported for movement toward substantially coplanar relationship with said end plane, such rim movement providing a first stage of collapse of the said steering wheel, said impact energy absorbing structure being constructed and arranged to deformably collapse with progressively increasing resistance to an impact load applied to said steering wheel in excess of that causing said first stage collapse to provide a second stage of collapse of said steering wheel.

4. A two-stage collapsible steering wheel comprising a rim, a hub, and an impact cone structure interposed between said rim and hub, said impact cone structure comprising an inverted frustum-shaped member, the peripheral wall of said member comprising a series of stepped portions of decreasing diameter, the axial distance between said hub and the large diameter end of said cone structure being substantially greater than the axial distance between the large diameter end of said cone structure and said rim, axially resilient means supporting said rim on said large diameter end for movement toward substantially coplanar relationship with the latter under an impact load, such rim movement providing a first stage of collapse of said steering wheel, said impact cone structure stepped portions being constructed and arranged to telescopically and deformably collapse with energy absorbing effect under an impact load applied to said steering wheel in excess of that causing said first stage collapse to provide a second stage of collapse of said steering wheel.

5. A two-stage collapsible steering wheel comprising a rim, a hub, and an inverted impact cone structure having its large diameter end axially spaced from said hub and its small diameter end attached to said hub, spoke means connecting said rim to said large diameter end of said cone structure, said spoke means being constructed and arranged to be torsionally stiff and axially resilient, said spoke means normally maintaining said rim in noncoplanar relationship to the large diameter end of said cone structure but permitting axial movement under an axially applied impact load to provide a first stage of collapse of said steering wheel, said impact cone structure comprising a series of stepped portions of decreasing diameter, said stepped portions being adapted to telescopically and deformably collapse with energy absorbing effect under an impact load in excess of that capable of causing movement of said rim toward said hub to provide a second stage of collapse of said wheel.

6. A two-stage collapsible steering wheel comprising a rim, a hub, an inverted impact cone structure having its large diameter end axially spaced from said hub and its small diameter end attached to said hub, spoke means connecting said rim to said large diameter end of said cone structure, said spoke means being constructed and arranged to be torsionally stiff and axially resilient, said spoke means normally maintaining said rim in noncoplanar relationship to the large diameter end of said cone structure but permitting axial movement under an axially applied impact load to provide a first stage of collapse of said steering wheel, said impact cone structure comprising a series of stepped portions of decreasing diameter, said stepped portions being adapted to telescopically and deformably collapse with energy absorbing effect under an impact load in excess of that capable of causing movement of said rim toward said hub to provide a second stage of collapse of said wheel, a hub pad of resilient material, and means supporting said hub pad above said impact cone structure.

7. A two-stage collapsible steering wheel comprising a rim, a hub, an inverted impact cone structure having its large diameter end axially spaced from said hub and its small diameter end attached to said hub, spoke means connecting said rim to said large diameter end of said cone structure, said spoke means being constructed and arranged to be torsionally stiff and axially resilient, said spoke means normally maintaining said rim in noncoplanar relationship to the large diameter end of said cone structure but permitting axial movement under an axially applied impact load to provide a first stage of collapse of said steering wheel, said impact cone structure comprising a series of stepped portions of decreasing diameter, said stepped portions being adapted to telescopically and deformably collapse with energy absorbing effect under an impact load in excess of that capable of causing movement of said rim toward said hub to provide a second stage of collapse of said wheel, a hub pad of resilient material, and means supporting said hub pad above said impact cone structure, said pad comprising an annular member having maximal thickness over the rigid periphery of the impact cone structure.

References Cited in the file of this patent

UNITED STATES PATENTS

| | | |
|---|---|---|
| 2,218,841 | Bluemel | Oct. 22, 1940 |
| 2,894,413 | Schmid | July 14, 1959 |
| 2,899,214 | D'Antini | Aug. 11, 1959 |
| 2,913,924 | Pratt | Nov. 24, 1959 |
| 2,946,869 | Parks et al. | July 26, 1960 |